US009459096B2

(12) United States Patent
Guasco

(10) Patent No.: US 9,459,096 B2
(45) Date of Patent: Oct. 4, 2016

(54) METHOD OF CALIBRATION OF A MATHEMATICAL MODEL OF A COORDINATE MEASURING MACHINE FOR THE COMPENSATION OF DYNAMIC ERRORS DUE TO DEFORMATION

(75) Inventor: Giampiero Guasco, Rivalta di Torino (IT)

(73) Assignee: HEXAGON METROLOGY S.P.A., Moncalieri (IT)

( * ) Notice: Subject to any disclaimer, the term of this patent is extended or adjusted under 35 U.S.C. 154(b) by 832 days.

(21) Appl. No.: 13/541,919

(22) Filed: Jul. 5, 2012

(65) Prior Publication Data

US 2013/0173199 A1 Jul. 4, 2013

(30) Foreign Application Priority Data

Jul. 6, 2011 (EP) .................................... 11425179

(51) Int. Cl.
*G01B 21/04* (2006.01)
(52) U.S. Cl.
CPC ........... *G01B 21/045* (2013.01); *G01B 21/042* (2013.01)
(58) Field of Classification Search
CPC ..... G01B 5/00; G01B 21/042; G01B 21/045
USPC .............. 702/34, 42, 95, 182, 185; 700/299; 73/862.08
See application file for complete search history.

(56) References Cited

U.S. PATENT DOCUMENTS

| 6,015,473 | A | 1/2000 | Rosenberg et al. | |
| 7,142,999 | B2 * | 11/2006 | Grupp et al. | ................... 702/95 |
| 8,606,426 | B2 * | 12/2013 | Hwang et al. | ................. 700/299 |
| 2002/0138999 | A1 | 10/2002 | Dubois | |
| 2005/0102118 | A1 | 5/2005 | Grupp et al. | |
| 2009/0320609 | A1 * | 12/2009 | Xia et al. | ................... 73/862.08 |
| 2011/0060542 | A1 | 3/2011 | Guasco et al. | |

FOREIGN PATENT DOCUMENTS

EP 2 167 912 3/2010

OTHER PUBLICATIONS

European Search Report in related EP 11 42 5179 completed Nov. 16, 2011.
Ljung, Lennart, "System Identification—Theory for the user", publisher Prentice Hall, Upper Saddle 10 River, N.J. 1999.
Bolzerem etal, "On discrete-time H∞ fixed-lag smoothing" IEEE Trans. on Signal Processing, vol. 52, No. 1, pp. 132-141, 2004.

* cited by examiner

*Primary Examiner* — Alexander Satanovsky
*Assistant Examiner* — Felix Suarez
(74) *Attorney, Agent, or Firm* — Maschoff Brennan

(57) ABSTRACT

A method of calibration of a mathematical model for the compensation of errors due to dynamic deformation of a measuring machine equipped with a mobile unit able to move a stylus probe in un measuring volume, wherein the model provides, in response to at least one input quantity correlated with a control signal of said drive means, a plurality of output quantities comprising at least one component of the measurement error introduced by the deformation and at least one quantity detected by a laser sensor and correlated with the deformation. In the calibration step, the mobile unit is subjected to a movement cycle constituted by small-amplitude oscillations of variable frequency, following the law of sinusoidal motion, keeping the tip of the probe blocked; during the movement cycle, the input and output quantities are sampled and supplied to an algorithm for model identification.

9 Claims, 6 Drawing Sheets

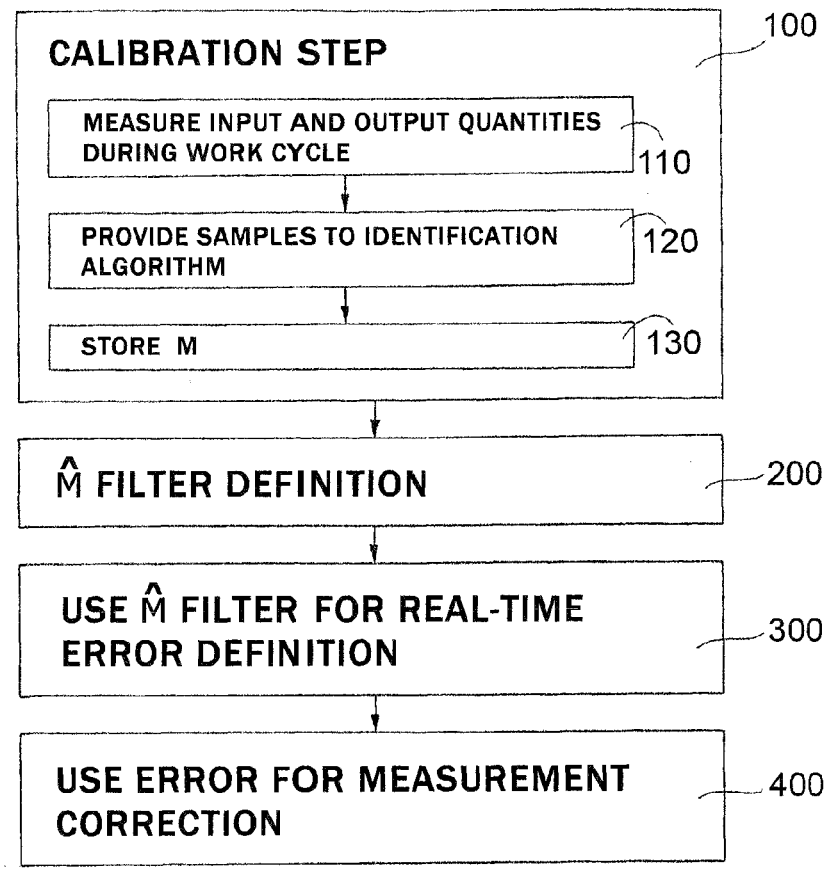
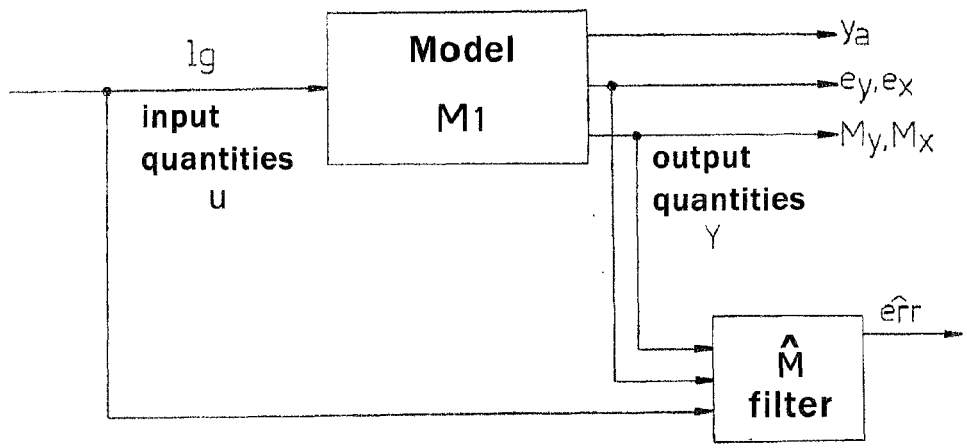

METHOD OF CALIBRATION OF A MATHEMATICAL MODEL OF A COORDINATE MEASURING MACHINE FOR THE COMPENSATION OF DYNAMIC ERRORS DUE TO DEFORMATION

CROSS-REFERENCE TO RELATED APPLICATIONS

This application claims priority to European Patent Application No. 11425179.6 filed on Jul. 6, 2011, the contents of which are hereby incorporated by reference in its entirety.

TECHNICAL FIELD

The present invention relates to a method of calibration of a mathematical model of a coordinate measuring machine for the compensation of dynamic errors due to deformation.

STATE OF THE PRIOR ART

As is known, coordinate measuring machines generally comprise three carriages movable along the coordinate axes of a Cartesian reference system and able to move a measurement sensor within a measuring volume. The machine is able to supply as output the coordinates of a piece detected by the measurement sensor, calculated as a function of the position of the carriages along the respective axes.

More specifically, coordinate measuring machines comprise a base structure equipped with a guide running along a first axis, for example, a bed in granite or another material or a column structure, a first carriage movable on the base structure along the first axis, a second carriage carried by the first carriage and movable along a second axis orthogonal to the first axis and a third carriage carried by the second carriage end movable with respect to the latter along a third axis orthogonal to the first two axes. The measurement sensor is carried by the third carriage.

As a rule, the first axis is horizontal; depending on the type of machine, the second axis can be horizontal and the third axis vertical, or vice versa.

For example, in bridge or gantry-type machines, the first carriage comprises a horizontal cross member defining the second axis on which the second carriage moves and the third carriage is constituted by a vertically mobile column carried on the second carriage.

Instead, in horizontal-arm type machines, the first carriage comprises a vertical column defining the second axis along which the second carriage moves and the third carriage is constituted by a horizontally movable horizontal arm carried by the second carriage.

Movement of the carriages is performed by using electric motors that transmit the driving force to the carriages via suitable kinematic mechanisms or, alternatively, linear electric motors integral with the carriages themselves.

The accelerations necessary to perform the measurement cycles in increasingly shorter times require high driving forces, such as to induce elastic deformation of the machine's moving parts due to a dynamic (inertial) effect. This deformation, also due to the lightened structure of the moving parts, can be significant for measurement precision.

In order to guarantee the class of precision of the measuring machine, the measurement error caused by the elastic deformation must be estimated and then compensated.

US2005/0102118 illustrates the use of a laser to determine and compensate errors deriving from elastic deformation in coordinate measuring machines. A laser emitter and sensor are arranged on a movable element of the coordinate measuring machine, with a reflector on a reference plane. Error determination and compensation are performed on the relative movement between the reflector on the one side and the emitter and the sensor on the other.

EP-A-2160565 and EP-A-2167912 illustrate a measuring machine in which a laser sensor is associated with a movable member of the machine and provides values correlated with the dynamic deformation of the mobile unit; these values are processed by means of a mathematical model to calculate and compensate the measurement errors of the machine due to dynamic deformation.

In the calibration step, the position error along the Y and X axes is directly measured by mounting, on the reference plane, a two-dimensional position transducer, immune to the deformation of machine's moving parts and measuring the difference between the position of the head of the measurement sensor detected by the two-dimensional position transducer and the position as detected by the machine.

The position error along the Z axis, at least in a bridge machine, is considered negligible.

SUBJECT OF THE INVENTION

The object of the present invention is that of providing a simpler and less expensive method of calibration, which, in particular, enables avoiding the use of an additional instrument, such as a two-dimensional sensor, and which can be performed with the machine in its measuring set-up.

BRIEF DESCRIPTION OF DRAWINGS

For a better understanding of the invention, some preferred embodiments shall be described hereunder, by way of non-limitative examples and with reference to the attached drawings, where:

FIG. 5 is a block diagram of a compensation method of the dynamic deformation employing the method of calibration according to the present invention;

FIG. 6 is a block diagram of a model for implementing the compensation method;

PREFERRED EMBODIMENT OF THE INVENTION

Figure 1:
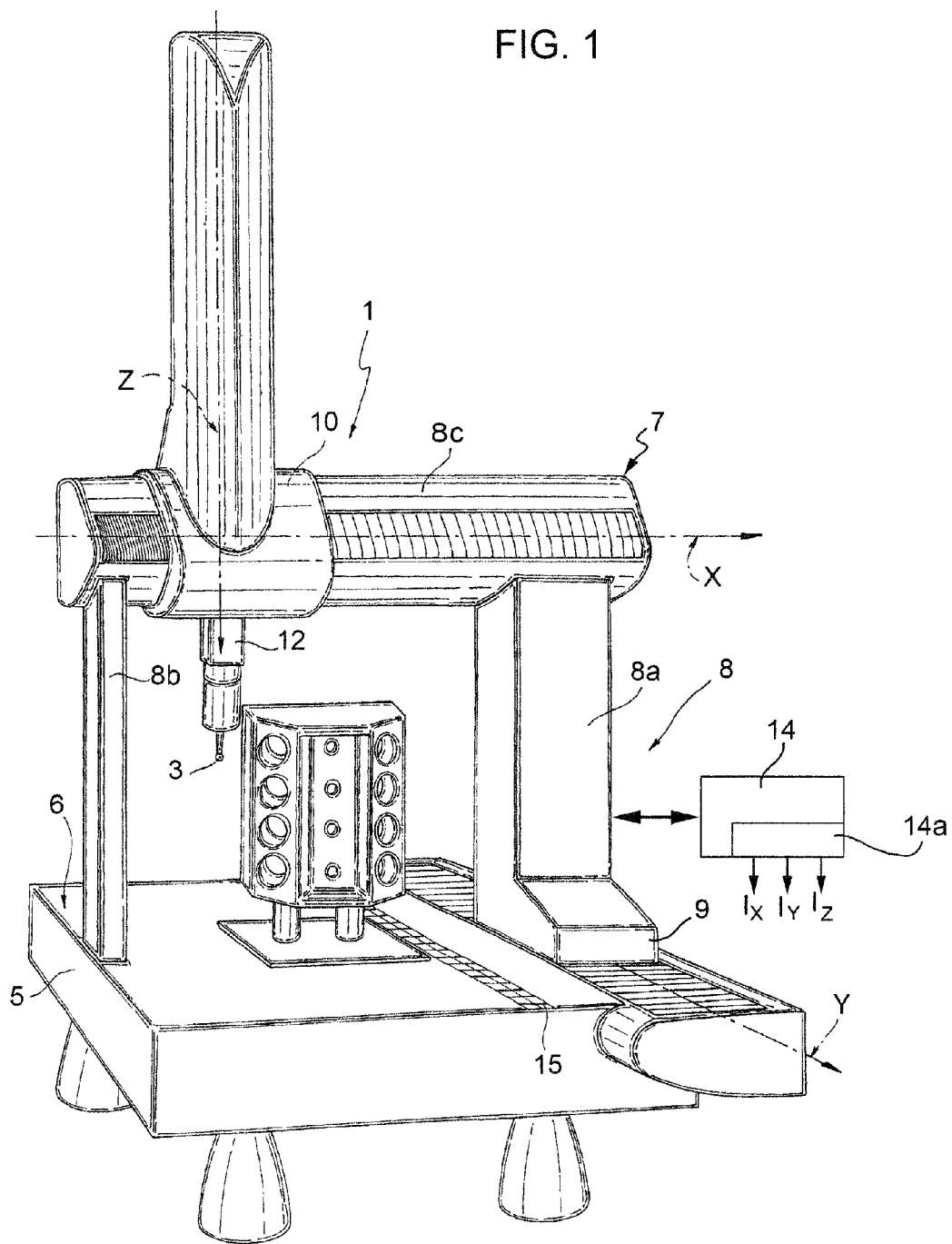
FIG. 1 shows a bridge measuring machine according to the present invention.

FIG. 1 shows a bridge-type measuring machine 1, comprising a bed 5 equipped with a flat horizontal upper surface 6 or reference plane and a mobile unit 7.

The mobile unit 7 comprises a motor-driven carriage 8 that moves on the bed 5 along a first horizontal axis (Y axis) of an X-Y-Z Cartesian reference system of the measuring volume.

The carriage 8 has a bridge structure and comprises two vertical uprights 8a and 8b and an upper horizontal cross member 8c that extends between the upper ends of the vertical uprights 8a and 8b.

At the bottom, upright 8a comprises a motor-driven slide 9 sliding on guides 11 parallel to the Y axis and obtained, in a known manner, in proximity to a longitudinal edge of the bed 5.

The cross member 8c carries a slide 10 that slides on guides (not shown) along an axis parallel to a second axis (X axis) of the reference system.

A vertical column 12, movable along a third axis (Z axis) of the reference system is mounted on the slide 10. At the bottom, the vertical column 12 carries a measurement sensor 3 (of known type), comprising a flange 30 constrained to the column 12 and a stylus 31 projecting from the flange 30 and elastically constrained to it, in a known manner, with a limited possibility of relative translation along its own axis and along the two axes of the flange perpendicular to each other and to the axis of the stylus. The stylus 31 terminates in a spherical tip 32, able to interact with the piece to be measured.

If the flange 30 is rigidly fixed to the column 12, the axis of the stylus 31 is parallel to the Z axis, when quiescent, and the three degrees of freedom of the stylus with respect to the flange 30 enable movements of the tip 32 substantially along the X, Y and Z axes.

Alternatively, the flange 30 can be mounted on the column 12 by means of an articulated device with two axes of rotation, or wrist, of known type and not shown.

The carriage 8, slide 10 and column 12 are equipped with respective motors 13, for example, linear motors (of which only one is visible in FIG. 2), which control movement along the respective coordinate axes.

The measuring machine 1 is controlled by a control unit 14 equipped with a power section 14a which provides the supply currents IY, IX and IZ to the respective electric motors of the carriage 8, slide 10 and column 12 for moving the measurement sensor 3 along the Y, X and Z axes and consequently its positioning within the measuring volume.

The measuring machine 1 provides as output—by means of software based on algorithms of known type—the position xa, ya, za of the measurement sensor 3 in the measuring volume by detecting the position of the slides along the respective X, Y and Z axes.

In the above-described operating conditions, the position of the measurement sensor 3 is affected by a dynamic position error ex, ey, ez with respect to the measured values xa, ya, za, due to the fact that the mechanical structure of the mobile unit 7 that supports the measurement sensor 3 (principally vertical upright 8a, the cross member 8c and the connection area between the upper end of upright 8a and the cross member 8c) undergoes elastic deformation as a result of the forces impressed by the electric motors that move slides 8 and 10.

Figure 3:
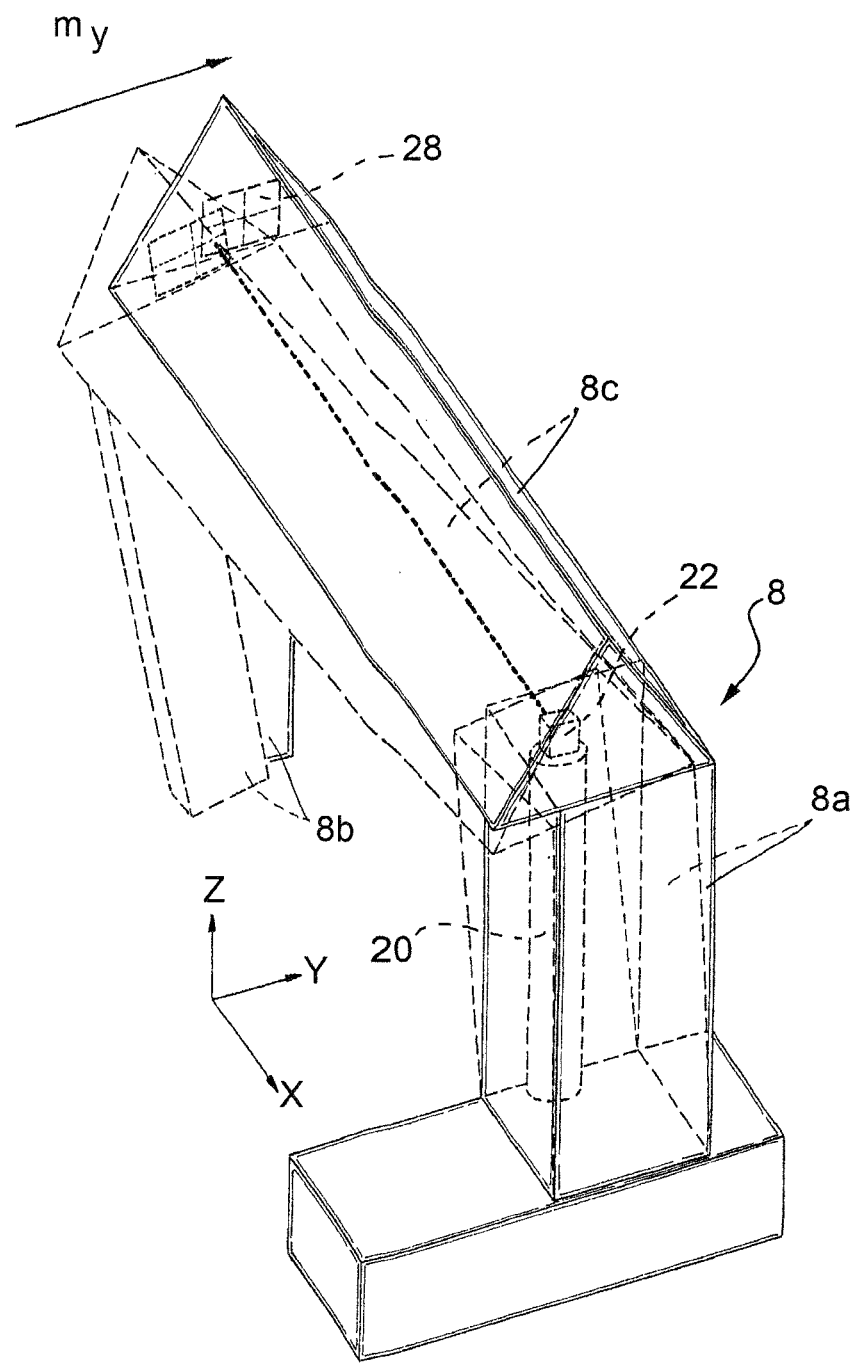
FIG. 3 is a perspective and schematic view of a carriage of the machine of FIG. 1, in a first form of dynamic deformation.
Figure 4:
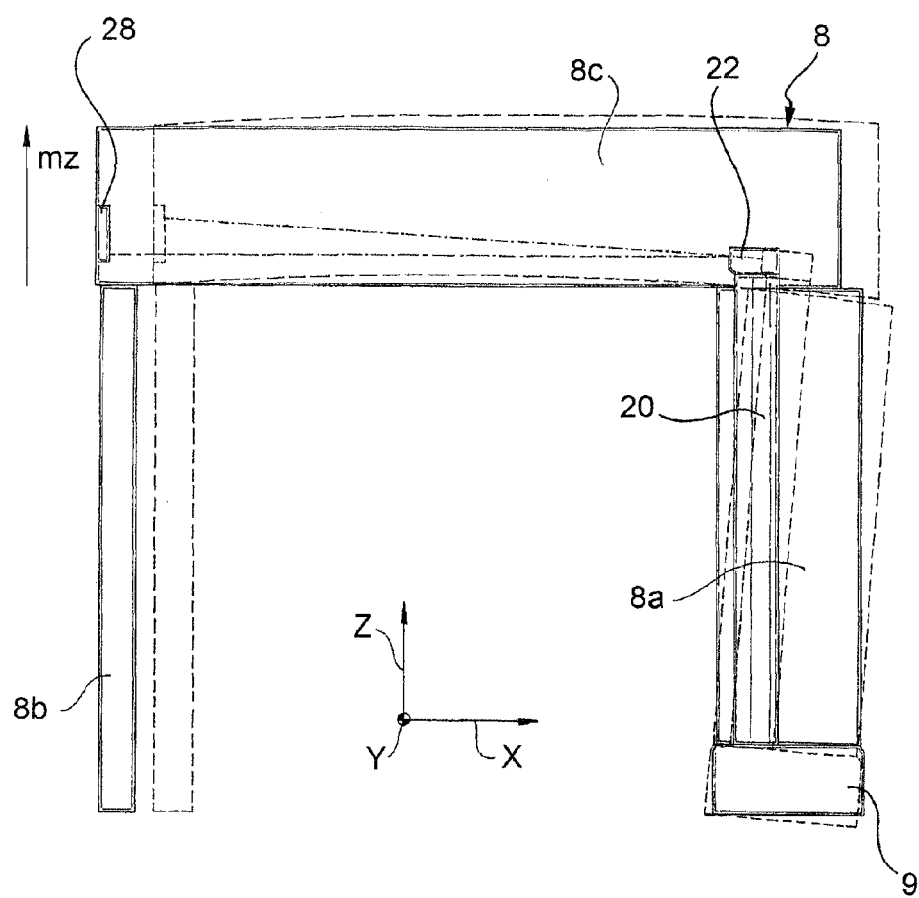
FIG. 4 is a front and schematic view of the carriage of FIG. 3, in a second form of dynamic deformation.

The deformation of the mobile unit 7 of the measuring machine 1 is exemplified in FIGS. 3 and 4.

FIG. 3 shows the deformation caused by the movement of carriage 8 along the Y axis. This deformation mainly comprises:

bending of the upright 8a;
bending of the cross member 8c;
twisting of the upright 8a around the Z axis; and
twisting of the cross member 8c around the X axis.

FIG. 4 shows instead the deformation caused by the movement of slide 10 along the X axis.

This deformation mainly comprises:
deformation of the joint between the upright 8a and the cross member 8c;
bending of the cross member 8c;
rotation of the upright 8a around the Y axis; and
translation of the cross member 8c along the X axis.

A laser sensor 16 is also installed on the measuring machine 1 to provide information on the dynamic deformation to which the mobile unit 7 is subjected during movements of the carriage 8 and the slide 10 (regarding the deformation, see what was said with reference to FIGS. 3 and 4).

Figure 2:
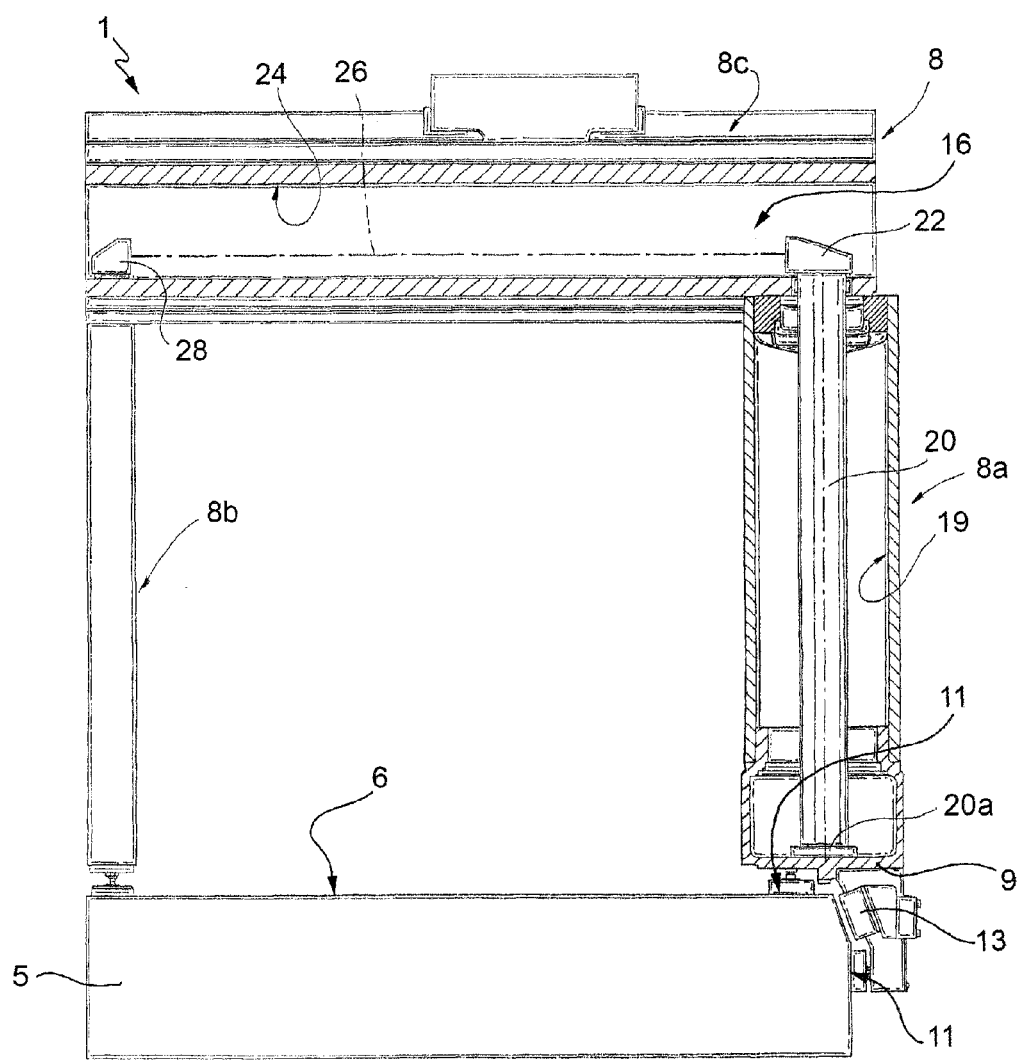
FIG. 2 is a front and partially cross-sectional view of the machine of FIG. 1.

With particular reference to FIG. 2, the laser sensor 16 is housed in a longitudinal cavity 24 of the cross member 8c and comprises a laser emitter 22 arranged at one end of the cavity 24 and a target 28 arranged at the opposite end of the cavity 24. The emitter 22 emits a laser beam 26 that travels through the cavity 24 parallel to the X axis and hits the target 28.

The emitter 22 is expediently supported by a vertical bar 20, as rigid as possible, which extends inside a vertical cavity 19 of upright 8a and has a first lower end 20a rigidly fixed to slide 9 (and therefore immune to the deformation of the vertical upright 8a) and a second upper end that projects from upright 8a into the cavity 24 of the cross member 8c, in which the laser emitter 22 device is fixed.

The target 28 consists of a PSD (Position-Sensitive Device, of known type) which detects displacements in the point of incidence of the laser beam 26 along two axes parallel to the Y and Z axes of the reference system, as a function of the deformation of the mechanical structure, with respect to a reference position corresponding to an undeformed condition.

The displacements my, mz of the laser beam detected on the target 28 along the Y and Z axes, together with other information, enable tracing back (for example, by means of techniques described in the following) to the dynamic deformation to which the mechanical structure was subjected as a result of moving the Y and X axes.

In an initial calibration step (block 100, FIG. 2), an input-output model M is defined that describes the dynamic behaviour of the measuring machine 1 (this step is also defined as model identification).

The input-output model M (FIG. 6) is multivariable and has as input (u) the supply currents of the motors for controlling movements along the respective X and Y axes and as output (y) a plurality of quantities that include the position xa, ya of the measurement sensor 3 obtained from the axes of the machine, the position errors ex, ey introduced by the elasticity of the machine 1 along the X and Y axes and the deformation my, mz of the machine measured by the laser sensor 16. The ez errors in a bridge machine can be considered negligible.

Due to the linearity of the phenomenon for small perturbations, the entire model is broken down into two models: a first model M1, which receives as input the current Iy of the Y-axis motor and provides as output the position ya along the Y axis, as well as the position errors ey, ex and deformation measurements my, mz along the Y and Z axes; and a second model M2, fully equivalent to model M1, which receives as input the current Ix of the X-axis motor and provides as output the position xa along the X axis, as well as the position errors ey, ex and the deformation measurements my, mz along the Y and Z axes.

In fact, when stress is exerted along one of the axes, there is a corresponding main error contribution along the same axis and a secondary contribution (due to the mechanical couplings) along the orthogonal axis. The overall error of the machine is given by applying the principle of superposition to the error contributions provided by the two models (this part will be explained further on).

If it were wished to take the errors along the Z axis into account as well, the models M1 and M2 would also have to provide the ez error as output and it would be necessary to provide a third model M3, equivalent to models M1 and M2, which receives as input the current Iz of the Z-axis motor and provides as output the position za along the Z axis, as well as the position errors ey, ex, ez and the deformation measurements my, mz along the Y and Z axes.

The definition of the first model M1 with respect to one of the axes (the Y axis) will be described below, in so far as the method of definition of the second model M2 with respect to the other axis (X axis) is fully equivalent.

As has been said, model M1 has current Iy as the input quantity u. The output quantities y are:
position ya along the Y axis provided by the machine 1;
deformation my, mz along the Y and Z axes measured by the laser sensor 16; and
position error ey, ex along the Y and X axes measured by the two-dimensional position transducer 15.

The differential equations that characterize model M1 are:

$$\dot{x} = Ax + Bu + K\epsilon$$

$$y = Cx + Du + \epsilon$$

where
u is the measured input (the current Iy to the motor), y the output quantities, x the dynamics state variables and $\epsilon$ represents the innovation process resulting from the identification. Finally, A, B, C, D and K are the matrices of the model.

In particular, $$u = [Iy]$$

$$y = \begin{bmatrix} ya \\ my \\ mz \\ ex \\ ey \end{bmatrix}$$

$$A = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{bmatrix}$$

$$B = \begin{bmatrix} b_{11} \\ b_{21} \\ b_{31} \\ b_{41} \\ b_{51} \\ b_{61} \end{bmatrix}$$

$$C = \begin{bmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \\ c_{41} & c_{42} & c_{43} & c_{44} & c_{45} & c_{46} \\ c_{51} & c_{52} & c_{53} & c_{54} & c_{55} & c_{56} \end{bmatrix}$$

$$D = \begin{bmatrix} d_{11} \\ d_{21} \\ d_{31} \\ d_{41} \\ d_{51} \end{bmatrix}$$

$$K = \begin{bmatrix} k_{11} & k_{12} & k_{13} & k_{14} & k_{15} \\ k_{21} & k_{22} & k_{23} & k_{24} & k_{25} \\ k_{31} & k_{32} & k_{33} & k_{34} & k_{35} \\ k_{41} & k_{42} & k_{43} & k_{44} & k_{45} \\ k_{51} & k_{52} & k_{53} & k_{54} & k_{55} \\ k_{61} & k_{62} & k_{63} & k_{64} & k_{65} \end{bmatrix}$$

With regard to the definition of the innovation process, refer to the book by Lennart Ljung entitled "System Identification—Theory for the user", publisher Prentice Hall, Upper Saddle River, N.J. 1999.

In the calibration step, the machine is subjected to a series of work cycles that induce dynamic errors ex, ey (assuming negligible ez errors), which can be conveniently measured as described below.

A tool 15 (FIG. 7) is fixed on the reference plane 6 and equipped with an upper, preferably conical, cavity 35, configured to accept the tip 32 of the sensor 3 substantially without any side play, such that the tip 32 is blocked in the cavity 35 in each of the directions of the X and Y coordinate axes.

If it were wished to take the ez errors into account as well, the tip 32 must also be blocked in direction Z, for example by magnetic attraction. For this purpose it is sufficient that the tip 32 of the stylus 31 is magnetic and that the tool 15 is made of a ferromagnetic material.

As is known, the measurement of a point performed by a measuring machine is defined by the sum of the readings of the machine axes xa, ya, za and the deflection components of the stylus 31 along the three axes (i.e. of the flange centre-tip centre vector) xd, yd, zd.

$$x = xa + xd; \quad y = ya + yd; \quad z = za + zd$$

If the tip 32 of the sensor 3 is blocked, leaving out the dynamic elastic deformation, the sum of the readings of the machine axis (xa, ya, za) and the deflections of the stylus 31 (xd, yd, zd) along each of the three axes is constant, defined by the coordinate of the tip 32 along the axis in question.

If the reference system is chosen with the origin at the centre of the tip, then $$xa + xd = 0; \quad ya + yd = 0; \quad za + zd = 0$$

Due to the elastic deformation of the machine's structure, in reality the readings of the machine axes are affected by the position errors ex, ey, ez and therefore the previous expressions become:

$$xa + ex + xd = 0; \quad ya + ey + yd = 0; \quad za + ez + zd = 0$$

from which it is easy to calculate the errors as a function of the readings of the machine axes and the deflections of the probe:

$$ex = -(xa + xd); \quad ey = -(ya + yd); \quad ez = -(za + zd)$$

To carry out calibration of model M1, the sensor 3 is subjected to a movement cycle by the mobile unit of the machine that comprises oscillations of small amplitude along direction Y, for example according to the law of sinusoidal motion.

Figure 8:
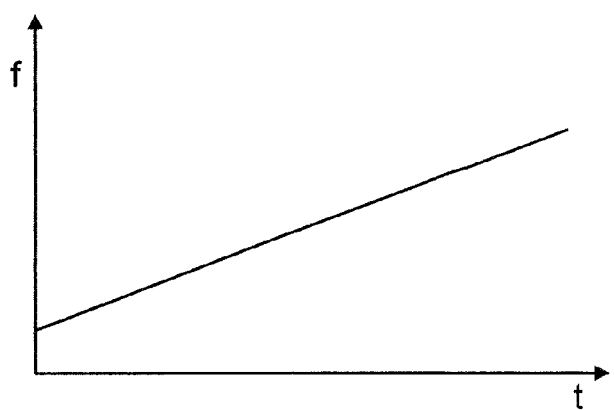
FIGS. 8 and 9 show the trends of the physical quantities correlated with a movement cycle of the carriage of FIG. 3.

In order to describe the dynamic behaviour of the machine as the excitation frequency changes, the movement cycle is performed with variable frequencies between a minimum value expediently below 5 Hz, for example 1 Hz, and a maximum value expediently greater than 50 Hz, for example 120 Hz (FIG. 8).

Figure 9:
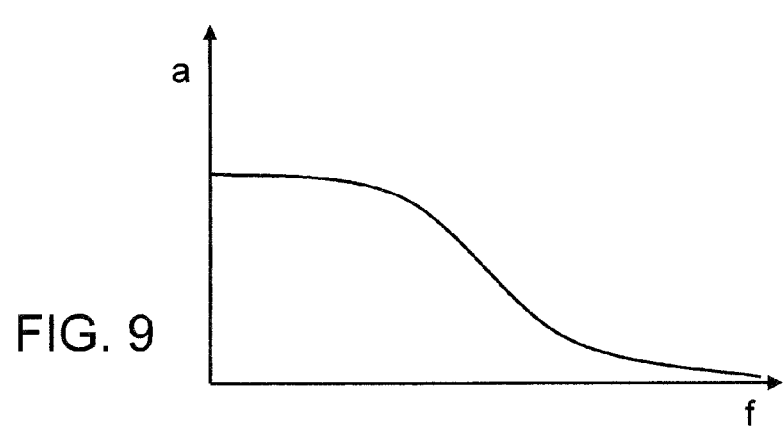

Preferably, the movement cycle starts at the minimum frequency (for example 1 Hz); the frequency is progressively increased in a continuous manner until the maximum value is reached (for example 120 Hz—FIG. 9).

At low frequencies (for example up to 40-50 Hz), the amplitude of the movement is mainly conditioned by the limits of the relative movement of the stylus 31 with respect to the flange 30, as the tip 32 of the stylus is blocked.

At higher frequencies, the amplitude of the movement must be reduced to work in the linearity range of motor control (FIG. 9).

During the calibration step, the input quantities u and output quantities y are sampled, for example with a sampling frequency of 500 microseconds, and stored.

The samples of the input and output quantities are supplied to an identification algorithm that, with a maximum-likelihood approach applied to a linear innovation model characterized by a quintuple of matrices A, B, C, D and K identifies the M1 input-output model as described by the above-indicated system of differential equations (for the definition of the maximum likelihood algorithm reference may be made to the book by Lennart Ljung entitled "System Identification—Theory for the user", publisher Prentice Hall, Upper Saddle River, N.J. 1999).

Strictly speaking, the model is not constant throughout the measuring volume of the machine, for which several calibration steps similar to that described above are carried out to cover the entire measuring volume.

The variability of the model regards the X and Z axes, which is why the measuring volume is expediently divided into a plurality of sections (for example, into nine sections: bottom-left, bottom-centre, bottom-right, centre-left, . . . ) in which respective models M1a, M1b, M1c, . . . M1n have been defined.

A comprehensive model M1compl can then be defined that approximates the various models M1a, M1b, M1c, . . . M1n in the measuring volume.

In particular, it has been found that the matrices A, B, D and K of the various models are substantially constant in the measuring volume, while only part of matrix C changes in the measuring volume.

The comprehensive model M1compl therefore comprises the matrices A, B, D and K that do not vary in the measuring volume and a matrix C having a portion (the rows corresponding to the ex, ey error signals) with variable parameters, based on the coordinates of the X and Z axes and therefore variable in the measuring volume:

$C=C(xa,za)$

This function $C=C(xa, za)$ is a non-linear function with respect to the X and Z axes and is obtained by interpolating the C matrices of the various models M1a, M1b, M1c, . . . , M1n, in the various sections of the working volume with b-spline functions (with regard to the definition of the spline functions, refer to the book by M. Broen, C Harris entitled "Neurofuzzy Adaptive Modelling and Control", publisher Prentice Hall International (UK) Limited 1994).

Following the definition of the comprehensive model M1compl that represents the "signature" of the particular machine being calibrated, step 100 is then followed by a step 200 in which an estimator filter 1 is designed starting from the comprehensive model M1compl.

For this design step, the M1compl model is represented in the following form (a similar representation is possible in a discrete manner in the time domain):

$\dot{x}=Ax+Bu+K\epsilon$ $y=C1x+D1u$ $z=C2x+D2u$ where:

$u = [Iy]$ $y = \begin{bmatrix} ya \\ my \\ mz \end{bmatrix}$ $z = \begin{bmatrix} ex \\ ey \end{bmatrix}$ $A = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{bmatrix}$ $B = \begin{bmatrix} b_{11} \\ b_{21} \\ b_{31} \\ b_{41} \\ b_{51} \\ b_{61} \end{bmatrix}$ $C1 = \begin{bmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \end{bmatrix}$ $D1 = \begin{bmatrix} d_{11} \\ d_{21} \\ d_{31} \end{bmatrix}$ $C2 = \begin{bmatrix} c_{41} & c_{42} & c_{43} & c_{44} & c_{45} & c_{46} \\ c_{51} & c_{52} & c_{53} & c_{54} & c_{55} & c_{56} \end{bmatrix}$ $D2 = \begin{bmatrix} d_{41} \\ d_{51} \end{bmatrix}$ Within the outputs, distinction is made between those measured (indicated by the symbol y in the above-listed system) and those not measured, but the object of estimation (indicated by the symbol z in the above-listed system).

Matrix C1 contains the first three rows of matrix C and matrix C2 contains the last two rows of matrix C. Similarly, matrix D1 contains the first three rows of matrix D and matrix D2 contains the last two rows of matrix D.

With regard to the variability of the measuring volume, according to this new representation of the model, only C2 matrices are effectively functions of the positions of the X and Z axes, whilst all the other matrices are constant:

$C2=C2(xa,za)$

The estimator filter 1 is designed with analytical techniques of robust filtering (in this regard, refer to the book by P. Colaneri, A. Locatelli and J. C. Jeromel entitled "Control theory and design, a RH2-RH-inf viewpoint", publisher Academic Press, 1997) on the basis of the previously identified comprehensive model M1compl.

An effective technique that allows the precision of the estimator to be improved consists in accepting that said filter supplies a time-delayed estimate (interpolation). This technique is described, for example, in the article by P. Bolzerem, P. Colaneri and G. De Nicolao entitled "Discrete-Time H-Infinity fixed lag smoothing" IEEE Trans. On Signal Processing, Vol. 52, No. 1, pp. 132-141, 2004.

In other words, at time (t) the estimator provides an estimate of the dynamic deformation regarding time (t-Delta). Delta is a time delay that is small enough not to jeopardize the efficiency of the machine in making the measurements taken readily available, but is sufficiently large to improve the precision of the estimate. In practice, it has been found that a value of Delta equal to a few hundredths of a second is suitable.

In response to the measured input values u and the output quantities y (measurements ya along the Y axis and deformation values my, mz), the estimator filter $\hat{M}1$ provides an estimate of the error.

The estimator filter $\hat{M}1$ is represented by the equations:

$$\dot{\hat{x}} = \hat{A}\hat{x} + Bu + \hat{K}y$$

$$\hat{z} = C2(xa,za)\hat{x} + D2u$$

where y is the vector of the outputs measured by the machine and u is the vector of the inputs, and where the matrices $\hat{A}, \hat{K}$ are the outcome of designing the estimator starting from the matrices A, B, K, C1, D1, according to the above-mentioned robust-filtering techniques.

In this way, the estimator filter $\hat{M}1$ provides as output a dynamic estimate of the error.

Following their definition, the matrices of the estimator filter $\hat{M}1$ of a linear type, are stored and integrated in the machine's measurement software for estimation of the unknown error (block 400).

The above-described operations are repeated, mutatis mutandis, with regard to the ex (and if necessary ez) errors, for the definition of a model M2 (and if necessary M3) and an estimator filter $\hat{M}2$ (and if necessary $\hat{M}3$).

In particular, for the definition of M2, the sensor 3 is subjected to small-amplitude oscillations by the mobile unit of the machine along direction X, using the law of sinusoidal motion and variable frequency as described with reference to model M1.

The results coming from the filters $\hat{M}1$ and $\hat{M}2$ (and if necessary $\hat{M}3$) are added together in accordance with the principle of superposition.

The above-described method is a non-limitative example of how the measurements my, mz can be used analytically to estimate the dynamic behaviour of the machine. Naturally, it is possible to use any other analytical method suitable for the purpose.

The above-described method can be applied to the calibration of the model of bridge machines equipped with laser sensors used for detecting other types of deformation, or to other types of measuring machines (for example, horizontal arm, gantry, etc.), as illustrated in patent application EP-A-2167912, the description of which is incorporated herein, for the parts needed.

The advantages that can be achieved with the present invention are evident from examination of its characteristics.

In particular, the calibration of the model for the correction of dynamic errors on the machine is carried out in simple and rapid manner, with the machine in its measuring set-up and without resorting to measurement instruments such as the two-dimensional sensor as described in the mentioned prior documents.

Finally, it is understood that changes and modifications may be made to the described method without leaving the scope of protection defined by the claims.

In particular, the movement cycle need not necessarily consist of a continuous frequency sweep. It is possible to adopt other excitation techniques, using different and non-periodic laws of motion, as long as the frequency spectrum is representative of the dynamic conditions of use. For example, displacements could be based on pseudo-random pulses, with a frequency spectrum similar to that of white noise.

Figure 7:
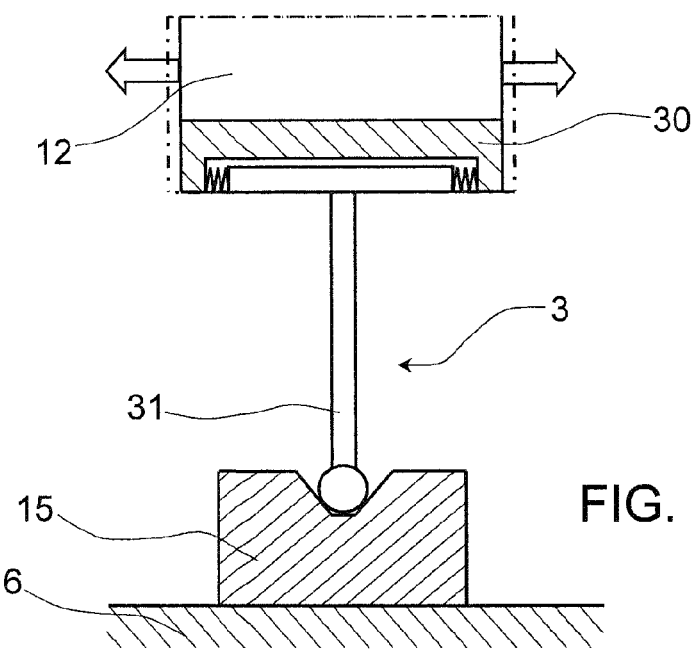
FIG. 7 schematically shows a stylus of a measuring machine and a tool.

In addition, the stylus could be of the pivoting type, i.e. having two degrees of rotational freedom with respect to the flange around two axes perpendicular to its own axis, instead of Cartesian (as shown in FIG. 7).

The invention claimed is:

1. A method of calibration of a mathematical model of a coordinate measuring machine for the compensation of errors due to dynamic deformation of a mobile unit of the coordinate measuring machine, the coordinate measuring machine comprising:
 a bed of the coordinate measuring machine;
 the mobile unit comprising at least one member movable with respect to the bed along an axis under the driving force of drive means, the stylus probe being attached to the mobile unit and including a tip, and
 a sensor configured to detect in real-time at least one quantity correlated with dynamic deformation of the mobile unit,
 wherein the mathematical model provides, in response to at least one input quantity correlated with a control signal of the drive means, a plurality of output quantities comprising at least one component of the measurement error introduced by the dynamic deformation and the at least one quantity detected by the sensor,
 the method of calibration comprising the steps of:
 fixing the tip of the stylus probe with respect to the bed;
 controlling the mobile unit to perform a movement cycle able to generate dynamic deformation of the mobile unit while the tip of the stylus probe remains fixed with respect to the bed, the movement cycle being performed with a law of motion having an amplitude of less than a displacement range of the tip of the stylus probe with respect to a retaining flange of the stylus probe and with a frequency spectrum representative of dynamic conditions of use of the coordinate measuring machine;
 collecting a plurality of samples of the input quantity and the plurality of output quantities during the movement cycle;
 storing the plurality of samples; and
 supplying the plurality of samples to an identification algorithm to define the mathematical model.

2. The method according to claim 1, wherein said movement cycle comprises a series of oscillations along at least one axis.

3. The method according to claim 2, wherein said oscillations are of variable frequency.

4. The method according to claim 3, wherein controlling the mobile unit to perform the movement cycle comprises varying the frequency of said oscillations in a continuous manner from a minimum value to a maximum value.

5. The method according to claim 4, wherein said minimum value is below 5 Hz.

6. The method according to claim 4, wherein said maximum value is greater than 50 Hz.

7. The method according to claim 3, wherein the amplitude of the oscillations is reduced as the frequency is increased, so as to maintain the control of said mobile unit along said axis in conditions of linearity.

8. The method according to claim 1, wherein said sensor is a laser sensor comprising an emitter fixed to a first portion of a movable member of said mobile unit and a target fixed to a second portion of said member mobile, and that said quantity detected by said sensor is the displacement of a point of incidence of the laser beam on the target with respect to a reference position corresponding to an unreformed condition of said mobile unit.

9. The method according to claim 8, wherein said step of detecting the displacement of the point of incidence of said laser beam is performed by means of a Position-Sensitive Device defining said target.

\* \* \* \* \*